(12) United States Patent
Eidson

(10) Patent No.: US 6,347,324 B1
(45) Date of Patent: Feb. 12, 2002

(54) ORDERING DEVICES

(75) Inventor: John C. Eidson, Palo Alto, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/228,842

(22) Filed: Jan. 12, 1999

(51) Int. Cl.[7] .............................................. G06F 7/08
(52) U.S. Cl. .................................... 708/207; 707/7
(58) Field of Search .............................. 708/207; 707/7

(56) References Cited

U.S. PATENT DOCUMENTS

| | | | | |
|---|---|---|---|---|
| 4,604,726 A | * | 8/1986 | Terzain | 707/7 |
| 4,713,786 A | * | 12/1987 | Roskind | 708/207 |
| 5,122,979 A | * | 6/1992 | Culverhouse | 708/207 |
| 5,532,948 A | * | 7/1996 | Kohno et al. | 708/207 |

* cited by examiner

*Primary Examiner*—David H. Malzahn

(57) ABSTRACT

An ordering device which enables off-loading of ordering tasks from a processor in a system. The ordering device includes an array of logic cells arranged as a set of rows. Each row is capable of storing a data value in the corresponding logic cells. Each logic cell performs a logic function which determines a state of a set of outputs of each row in response to the data values. The logic functions are preselected such that the states of the outputs of each row indicate an ordering of the data values. The ordering device may be employed in a wide variety of systems and may include application-specific arrays.

17 Claims, 6 Drawing Sheets

ORDERING DEVICES

BACKGROUND OF THE INVENTION

1. Field of Invention

The present invention pertains to the field of systems. More particularly, this invention relates to ordering functions in systems.

2. Art Background

A wide variety of systems commonly include computing resources that perform ordering functions. An ordering function may be defined as a function for arranging or sorting items according to a predetermined criteria. In many applications of such systems it is desirable to order items which are associated with numerical tags. Such numerical tags, for example, may represent a sequence number, a time stamp, a serial number, or an order number, etc.

In prior systems, ordering functions are usually implemented with software using one or more of a variety of know algorithms involving the numerical tags. Such algorithms include binary searches, bubble sorting and other techniques. Typically, such algorithms consume large amounts of computation time of the processing resources of a system. Unfortunately, this usually slows a system and may increase the cost of a system by requiring high power processing resources.

SUMMARY OF THE INVENTION

An ordering device is disclosed which enables off-loading of ordering tasks from a processor in a system. The ordering device includes an array of logic cells arranged as a set of rows. Each row is capable of storing a data value in the corresponding logic cells. Each logic cell performs a logic function which determines a state of a set of outputs of each row in response to the data values. The logic functions are preselected such that the states of the outputs of each row indicate an ordering of the data values. The ordering device may be employed in a wide variety of systems and may include application-specific arrays.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
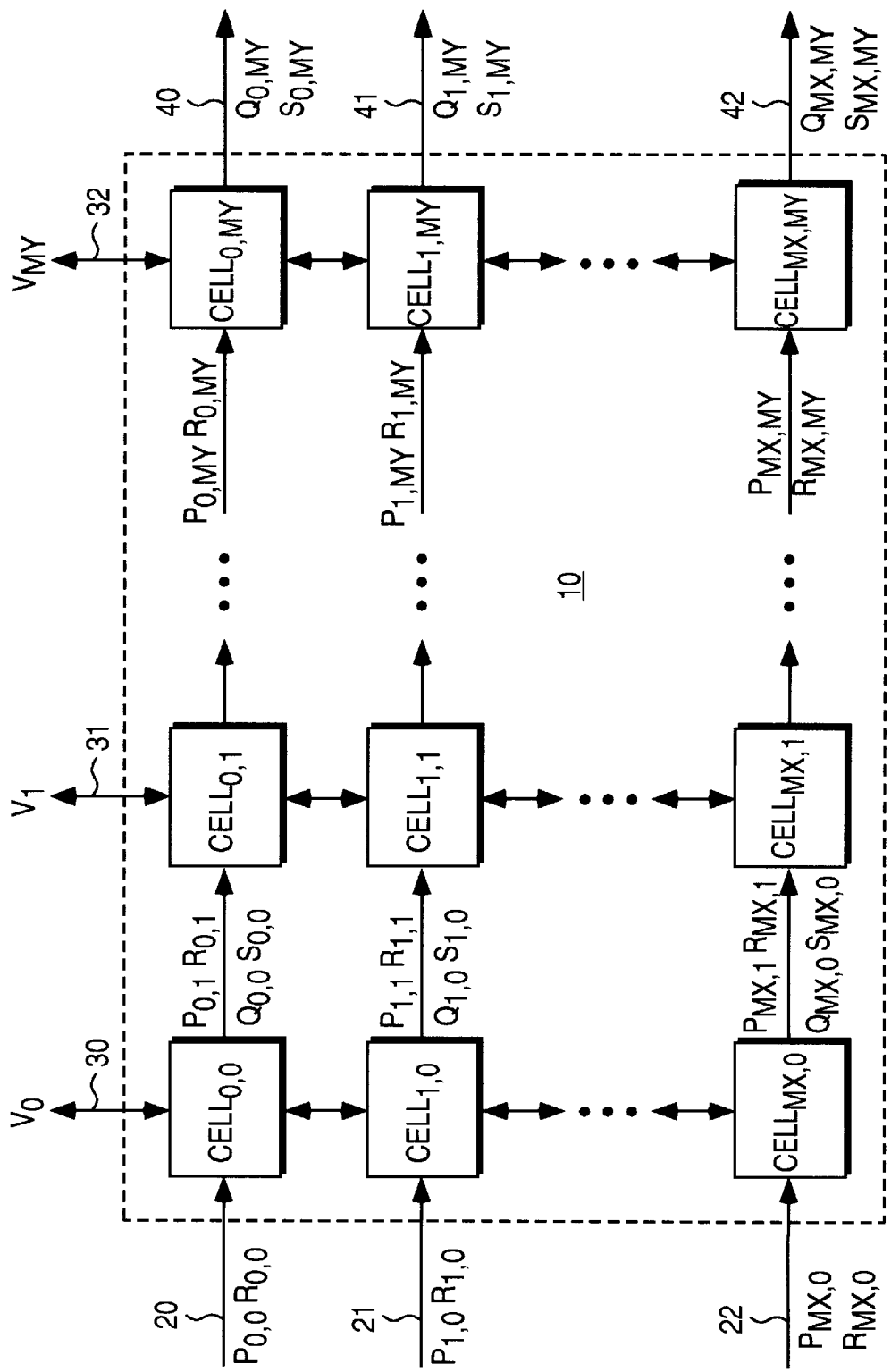
FIG. 1 shows an ordering array which may be configured to perform a variety of sorting functions.

FIG. 1 shows an ordering array 10 which may be configured to perform a variety of sorting functions. The sorting functions include a function for finding all integers less than a reference integer, a function for finding all integers greater than a reference integer, and a function for finding all integers equal to a reference integer. In addition, the sorting functions include a function for finding the maximum or minimum integer stored in the ordering array 10.

The ordering array 10 includes a set of logic cells ($CELL_{0,0}$–$CELL_{mx,my}$). The logic cells $CELL_{0,0}$–$CELL_{mx,my}$ are arranged as a set of rows 0-mx and a set of columns 0-my. The ordering array 10 receives a set of row inputs 20–22 ($P_{0,0}$–$P_{mx,0}$ and $R_{0,0}$–$R_{mx,0}$) and a set of column inputs 30–32 ($V_0$–$V_{my}$) and provides a set of row outputs 40–42 ($Q_{0,0}$–$Q_{0,my}$ and $S_{0,0}$–$S_{0,my}$). The ordering array 10 may be implemented as an application specific integrated circuit (ASIC) or field programmable gate array (FPGA) in which the logic cells $CELL_{0,0}$–$CELL_{mx,my}$ are programmed to perform a corresponding set of logic functions.

The logic cells $CELL_{0,0}$–$CELL_{mx,my}$ in the equations that follow are denoted as $CELL_{i,j}$ where i=0, 1, ... mx and j=0, 1, ... my. The logic state of the $CELL_{i,j}$ is denoted $K_{i,j}$. The inputs to the logic cells $CELL_{0,0}$–$CELL_{mx,my}$ are denoted as $P_{i,j}$ and $R_{i,j}$ and the column inputs 30–32 are denoted as $V_j$ and the outputs of the logic cells $CELL_{0,0}$–$CELL_{mx,my}$ are denoted as $Q_{i,j}$ and $S_{i,j}$ where i=0, 1, ... mx and j=0, 1, ... my.

In one embodiment, the ordering array 10 is configured to find which of the rows 0-mx stores an integer that is less than, greater than, or equal to a reference integer carried on the column inputs 30–32. The following are the Boolean equations programmed into the ordering array 10 in this embodiment.

$$Q_{i,j} = P_{i,j} + \overline{R_{i,j}} \cdot \overline{K_{i,j}} \cdot V_j$$

$$S_{i,j} = R_{i,j} + \overline{P_{i,j}} \cdot K_{i,j} \cdot \overline{V_j}$$

$$P_{i,j} = Q_{i,j-1}$$

$$R_{i,j} = S_{i,j-1}$$

$$P_{i,0} = R_{i,0} = \overline{\text{Enable}}$$

The output conditions Q and S provided on the outputs 40–42 in this embodiment are defined as follows:

| $Q_{i,my}$ | $S_{i,my}$ | meaning |
| --- | --- | --- |
| 0 | 0 | row = column |
| 0 | 1 | row > column |
| 1 | 0 | row < column |
| 1 | 1 | disabled |

In another embodiment, the ordering array 10 is configured to find the minimum integer stored in the rows 0-mx. The following are the Boolean equations programmed into the ordering array 10 in this embodiment. The columns 1-my provide a logic function rather than an input function.

$$Q_{i,j} = P_{i,j} \cdot [\overline{K_{i,j}} + K_{i,j} \cdot V_j]$$

$$V_j = [P_{0,j} \cdot K_{0,j} + \overline{P_{0,j}}] \cdot [P_{1,j} \cdot K_{1,j} + \overline{P_{1,j}}] \cdot \ldots \cdot [P_{my,j} \cdot K_{my,j} + \overline{P_{my,j}}]$$

$$P_{i,j} = Q_{i,j-1}$$

$$P_{i,0} = \text{Enable}$$

The function of the columns 1-my is an "AND" function of terms from each row 0-mx. This "AND" function may be implemented in an ASIC or FPGA using a "wired-OR" form with an open collector output of each cell to drive a vertical signal line in the ordering array 10.

The output conditions Q for finding the minimum are defined as follows:

| $Q_{i,my}$ | meaning |
|---|---|
| 0 | disabled or not minimum |
| 1 | row(s) = minimum |

In yet another embodiment, the ordering array 10 is configured to find the maximum integer stored in the rows 0-mx. The following are the Boolean equations programmed into the ordering array 10 in this embodiment. The columns 1-my provide a logic function rather than an input function.

$$Q_{i,j} = P_{i,j} \cdot [K_{i,j} + \overline{K_{i,j} \cdot V_j}]$$

$$V_j = [P_{0,j} \cdot K_{0,j}] + [P_{1,j} \cdot K_{1,j}] + \ldots + [P_{my,j} \cdot K_{my,j}]$$

$$P_{i,j} = Q_{i,j-1}$$

$$P_{i,0} = \text{Enable}$$

The function of the columns 1-my is an "AND" function of terms from each row 0-mx. This "AND" function may be implemented in an ASIC or FPGA using a "wired-OR" form with an open collector output of each cell to drive a vertical signal line in the ordering array 10.

The output conditions Q for finding the maximum integer are defined as follows:

| $Q_{i,my}$ | meaning |
|---|---|
| 0 | disabled or not maximum |
| 1 | row(s) = maximum |

In some embodiments, the ordering array 10 is configured to perform a particular one of the above functions using the equations given above. In other embodiments, the ordering array 10 may be programmed to perform multiple ones of the above functions. A global selection signal available to each $\text{CELL}_{i,j}$ may be used to select a particular function.

The ordering array 10 may be employed in a variety of systems including systems having a processor that performs application-specific tasks. The ordering array 10 enables off loading of sorting tasks from the processor. For example, a processor may load the ordering array 10 with values to be sorted and then generate a next set of values to be sorted while the ordering array performs its sorting function. The output of the ordering array 10 may be supplied back to the processor that generated the values to be sorted or may be supplied to a different processor depending upon the particular application of the ordering array 10.

In some systems, it may be useful to individually disable the rows 1-mx. For example, it may be desirable to disable a particular one of the rows 1-mx after it has been recognized as holding a maximum or minimum integer. In another example, it may be desirable to disable empty ones of the rows 1-mx from participating in a sorting operation.

Figure 2:
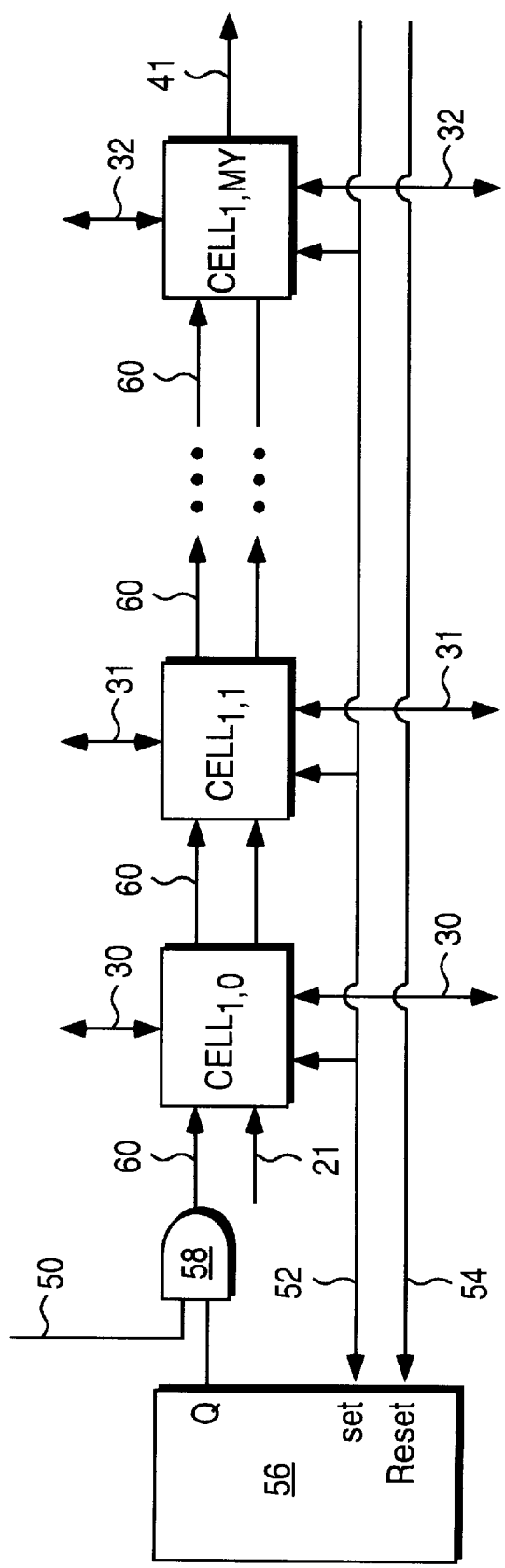
FIG. 2 shows circuitry for individually disabling the rows of the ordering array.

FIG. 2 shows circuitry for individually disabling the row 1 of the ordering array 10. Similar circuitry may be implemented in the remaining rows 0,2-mx. An array enable signal 50 provides a chip select for the ordering array 10 while each of the rows 1-mx is individually enabled or disabled by setting a corresponding flip-flop such as a flip-flop 56 for the row 1. The Q output of the flip-flop 56 and the array enable signal 50 are combined by an AND gate 58 to provide an enable/disable signal 60 to the cells of the row 1. A row enable signal 52 is used to load the row 1 with an integer value and to set the flip-flop 56 thereby enabling the row 1. A row disable signal 54 is used to reset the flip-flop 56 which disables the row 1.

Figure 3:
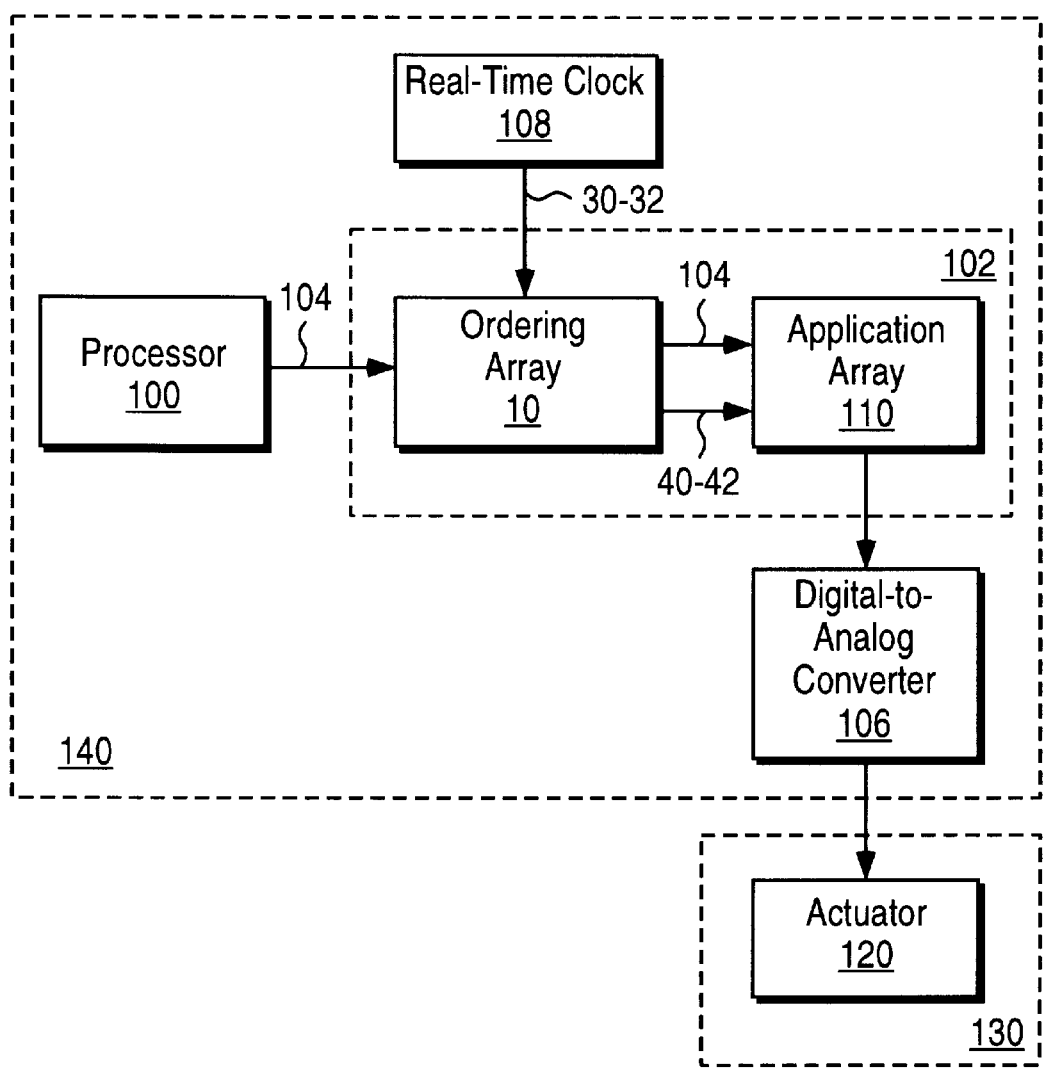
FIG. 3 shows an ordering array applied to a motion control system.

FIG. 3 shows a motion control module 140 which includes an ordering device 102 that off-loads time consuming ordering tasks from a processor 100. The motion control module 140 may be part of a motion control system which includes multiple motion control modules each of which controls motion along one or more axes of a device 130. The motion control module 140 controls motion along an axis corresponding to an actuator 120 of the device 130.

The device 130 represents any type of device or any type of mechanical, electrical, chemical, or combination system. Examples are numerous and include printers, plotters, and manufacturing systems found in a wide variety of industries. The following discussion focuses on an example embodiment in which the device 130 is a plotter in which the actuator 120 controls the x position of a pen. It is apparent, however, that the teachings provided with respect to the example embodiment are readily applicable to a variety of other devices and systems including very complex systems with many more axes.

The processor 100 generates a series of x control values to be applied to the actuator 120 according to a particular motion control function. An example motion control function is given by the equation $x = \cos \omega t$. The series of x control values to be applied to the actuator 120 may be computed by the processor 100 for predetermined t values.

The ordering device 102 includes the ordering array 10 and an application array 110. The application array 110 includes a row of cells corresponding to each row 0-mx of the ordering array 10. The processor 100 stores the t values used to compute the series of x control values into the ordering array 10 and stores the x control values into corresponding rows of the application array 110 via a signal path 104. The processor 100 may write the x control values and corresponding t values to the ordering device 102 in any order.

The ordering array 10 is configured to find which of the rows 0-mx stores an integer that is less than, greater than, or equal to a reference integer carried on the column inputs 30–32 using the Boolean equations given above. The t values in the ordering array 10 provide the logic states $K_{i,j}$. The output of a real-time clock 108 is applied to the column inputs 30–32. The row outputs 40–42 indicate to logic in the application array 110 which of the rows 0-mx equals the value in the real-time clock 108.

In response to the row outputs 40–42, the row of the application array 110 that corresponds to the row 0-mx of the ordering array 10 that equals the clock value on the column inputs 30–32 is read out to a digital-to-analog converter (DAC) 106. The DAC 106 provides analog control signals to the actuator 120. In other embodiments, digital control values may be provided to the actuator 120 and the actuator 120 may include a DAC and signal processing circuitry.

As the clock values applied to the column inputs 30–32 advance in time, an ascending order of t values in the ordering array 10 match to the column inputs 30–32 and the x control values corresponding to the ascending order of t values are read out of the application array 110 and applied to the actuator 120. Each matching row 1-mx may be individually disabled using circuitry described above. Thus, once the processor 100 loads a set of t values and corresponding x control values into the ordering device 102 it can proceed to other tasks such as computing new control values. The task of monitoring the real-time clock 108 and applying the control values is performed by the ordering device 102 without intervention from the processor 100.

Figure 4:
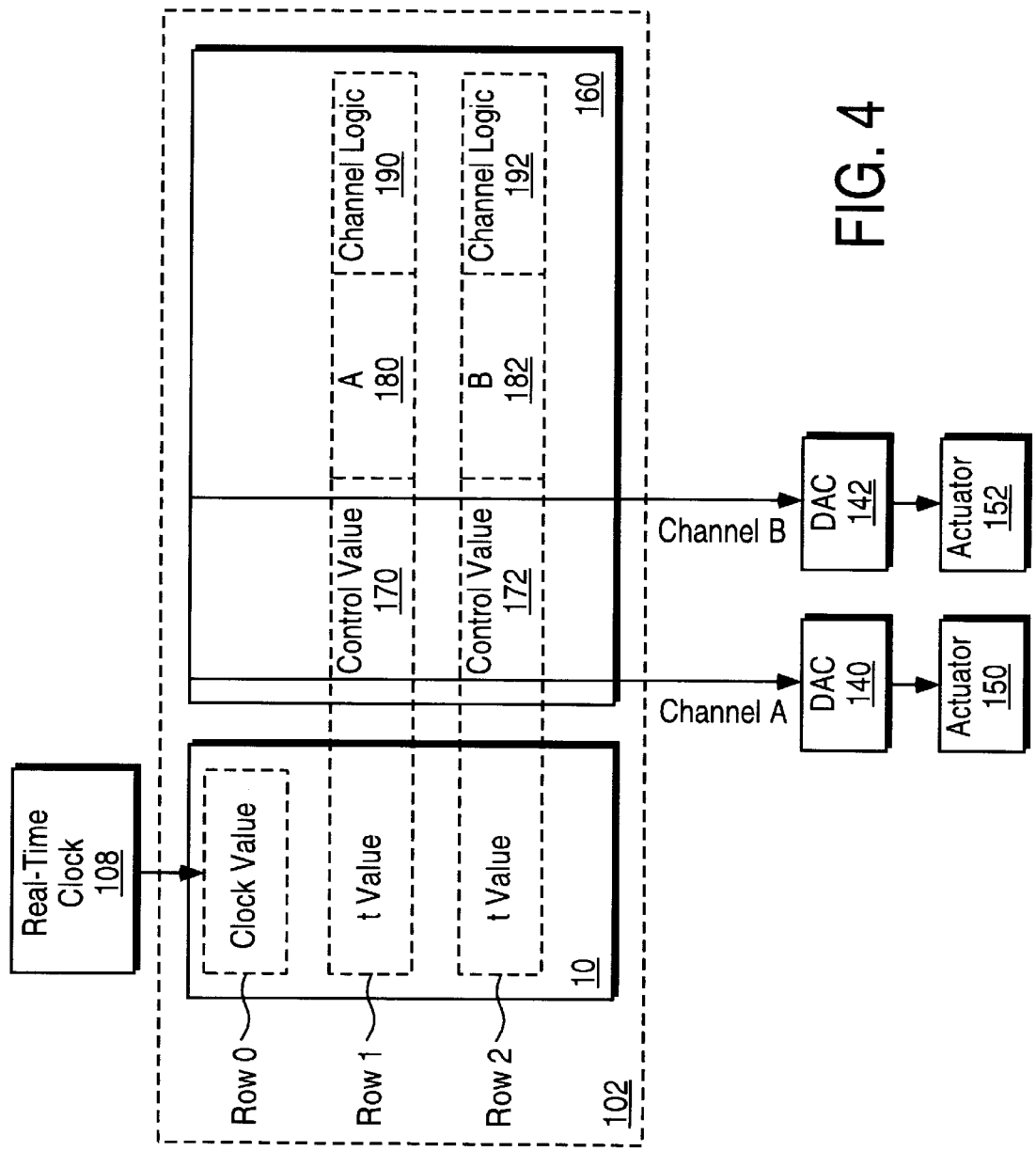
FIG. 4 shows another embodiment of an ordering array applied to a motion control system.

FIG. 4 shows an alternate embodiment of the ordering device 102 which drives a set of actuators 150–152. For example, the actuators 150–152 may drive the x and y axes, respectively, of a plotter device. In this embodiment, one of the rows 0-mx of the ordering array 10, in this example row 0, is continuously loaded with clock values from the real-time clock 108. In addition, the ordering array 10 is configured to find which of the rows 0-mx stores the minimum integer using the Boolean equations given above.

An application array 160 stores control values for both of the actuators 150–152. Control values for the actuator 150 are read out to a DAC 140 via channel A and control values for the actuator 152 are read out to a DAC 142 via channel B. For example, the row 1 of the application array 160 stores a control value 170, an indicator 180 that indicates that the control value 170 is for channel A, and includes a set of channel logic 190 for steering the control value 170 to the DAC 140 via channel A. Similarly, the row 2 of the application array 160 stores a control value 172, an indicator 182 that indicates that the control value 172 is for channel B, and includes a set of channel logic 192 for steering the control value 172 to the DAC 140 via channel A.

As the clock values applied to the row 0 of the ordering array 10 advance in time, an ascending order of t values in the remaining rows 1-mx of the ordering array 10 are recognized as the minimum. Each minimum row 1-mx triggers its corresponding channel logic in the application array 160. Each minimum row 1-mx is disabled once being recognized as the minimum using circuitry described above.

Figure 5:
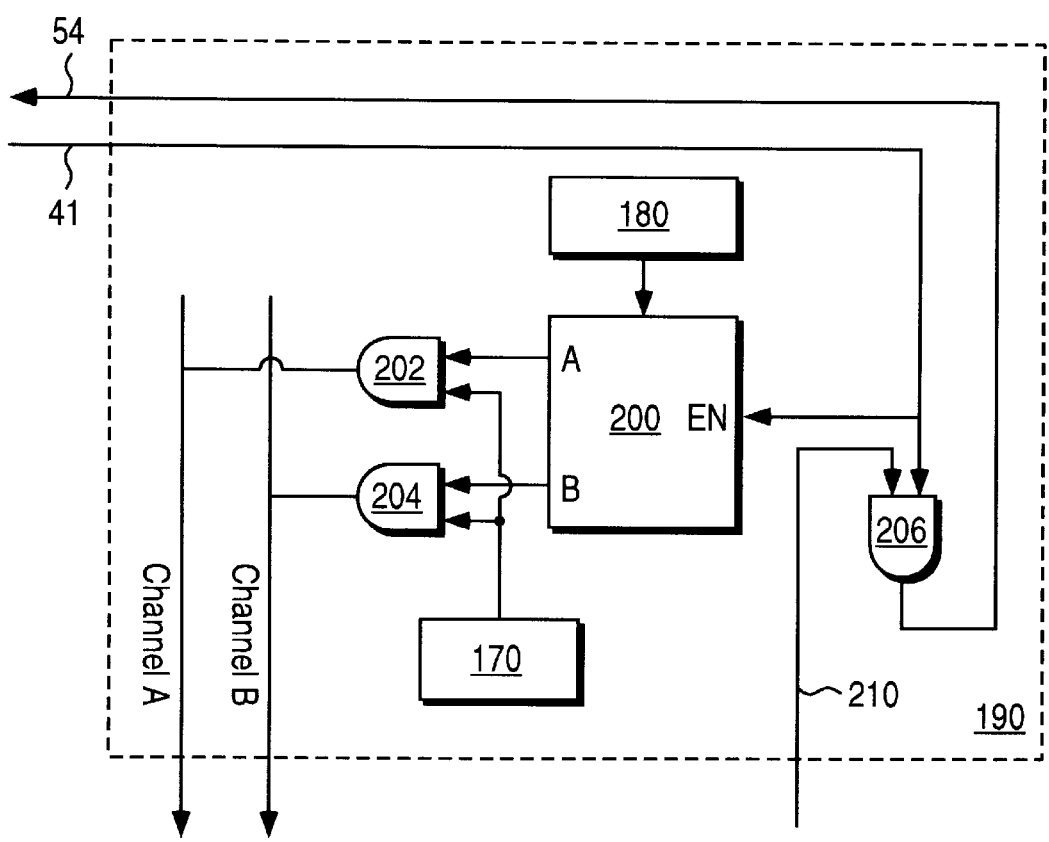
FIG. 5 shows an example implementation of the channel logic in an application array.

FIG. 5 shows an example implementation of the channel logic 190. The channel logic in the rows 2-mx of the application array 160 may be implemented in a similar manner. The control value 170 is gated onto channel A or channel B with a pair of AND gates 202–204. One or the other of the AND gates 202–204 is enabled by a selector circuit 200. If the indicator 180 indicates channel A then the AND gate 202 is enabled. If the indicator 180 indicates channel B then the AND gate 204 is enabled. The selector circuit 200 is enabled by the outputs 41 which provide the row result from row 1 of the ordering array 10 and indicate whether row 1 holds the minimum integer in the ordering array 10. If it does then the selector circuit 200 is enabled and the control value 170 is driven on channel A or B according to the indicator 180. The row result 41 is combined with phase-2 of a clock signal 210 using an AND gate 206 to provide the row disable signal 54 for the row 1.

The clock signal 210 is a 2 phase clock. Phase-1 of the clock signal 210 drives the real-time clock 108. Phase-2 of the clock signal 210 clocks the control value for the recognized minimum of the rows 1-mx of the ordering array 10 onto channel A or B and then resets the minimum row before the next phase-1 starts another recognition sequence in the ordering array 10.

Figure 6:
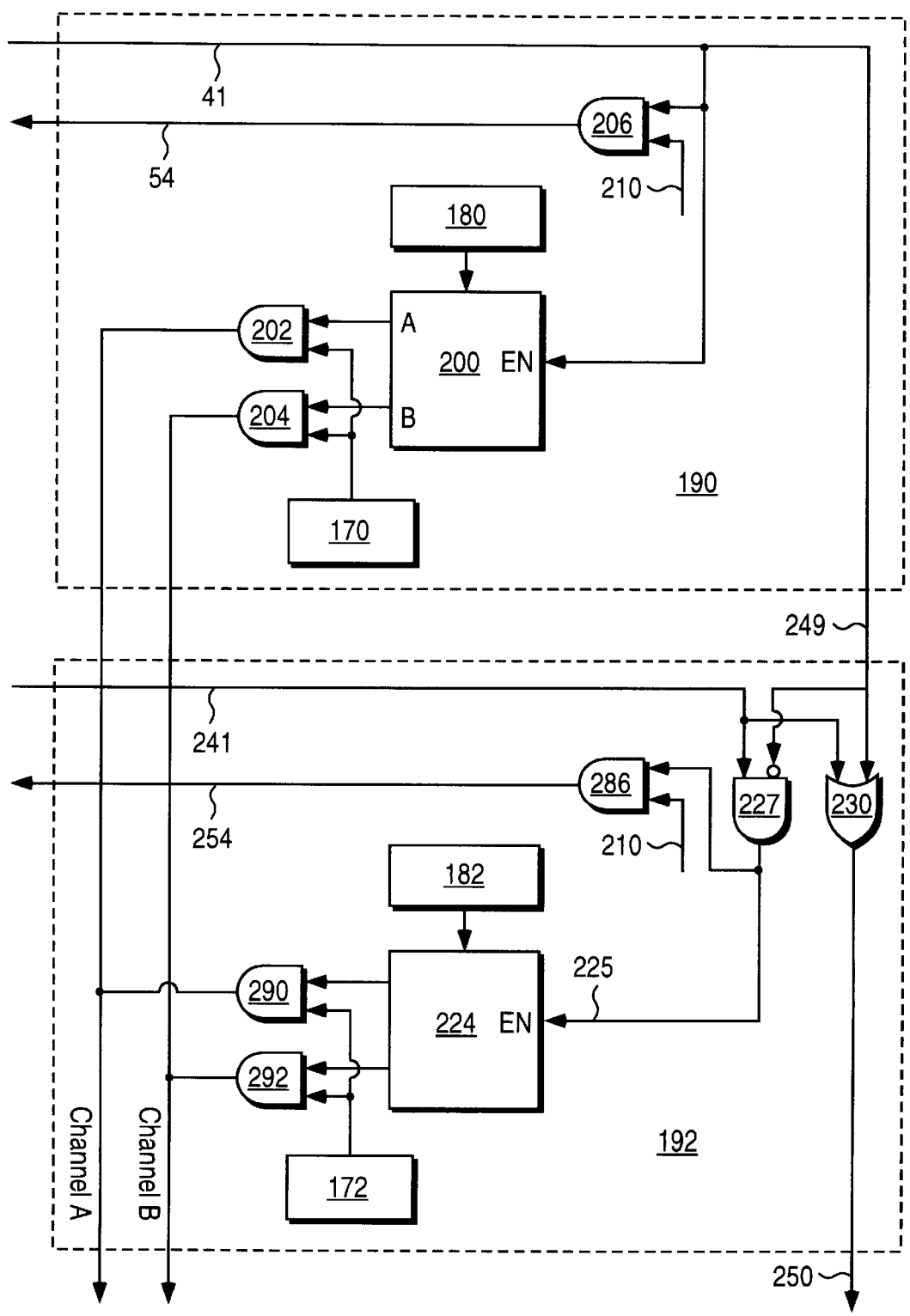
FIG. 6 shows circuitry useful for an embodiment in which more than one of the rows of an ordering array may hold a minimum value.

FIG. 6 shows circuitry in the channel logic of the application array 10 that may be employed in an embodiment in which more than one of the rows 1-mx may hold a minimum value. The channel logic 190 of the row 1 is substantially similar to that shown in FIG. 5. Each of the remaining rows 2-mx includes circuitry substantially similar to the circuitry shown for the channel logic 192.

The channel logic 192 includes a pair of AND gates 290–292 that gate the control value 182 onto the channel A or B in response to a selector circuit 224 which takes as input the indicator 182. An AND gate 286 provides a row disable signal 254 for the row 2. The generation of an enable signal 225 to the selector circuit 224 and the generation of the row disable signal 254 via the AND gate 286 is conditioned by a signal 249. The signal 249 is a "daisy chain" signal from the previous row. The previous row to the channel logic 192 of the row 2 is the channel logic 190 of the row 1.

The signal 249 is combined with a row result 241 for the row 2 by a gate 227. The gate 227 provides the enable signal 225 to the selector circuit 224 and an input to the AND gate 286. A daisy chain signal 250 to the next row, the row 3, is generated by combining the daisy chain signal 249 from the previous row, the row 1, with the row result 241 for the row 2 using an OR gate 230.

An ordering device according to the present techniques may be used to generate a histogram. The ordering array is configured to find which of its rows are less than or equal to its column inputs and the application array sums the number of row result lines that indicate this criteria and clears the rows after recognition. An array of measured values is written to the ordering array. The value applied its column inputs are stepped in regular intervals defining the bin size for a histogram. The sum for each bin is generated by the application array.

An ordering device according to the present techniques may be used to execute code bodies using a time-script. One of the rows of the ordering array reflects a real-time clock value. The ordering array is configured to find the minimum value. The recognized row causes a value to be read out of the application array and passed as a parameter to an interrupt service routine. This enables time-scripts to be stored in the ordering device and the corresponding code bodies are called based upon the real-time clock value.

An ordering device according to the present techniques may be used to order alarms on a highest-priority-oldest-time-stamp-first basis. The ordering array includes two arrays. A left array holds priority values and a second array holds time stamp values. The left array is configured to find its maximum rows. The row results from the left array cause the second array to sort the maximum priority rows to find a minimum time-stamp value of the highest priority rows. The row recognition in the second array causes a value from the application array to be passed to an interrupt service routine. Incoming alarm or similar urgency based messages are written to the ordering device and the ordering array automatically orders them on a highest-priority-oldest-time-stamp-first basis.

An ordering device according to the present techniques may be used for periodic or aperiodic behaviors. One of the rows of the ordering array reflects a real-time clock value. The ordering array is configured to find the minimum value of a set of time-stamps. The recognized row causes a value to be read out of the application array and passed as a parameter to an interrupt service routine or to a DAC. This enables generation of arbitrary preprogrammed waveform or code execution sequences. Aperiodic behavior can be generated by varying the rate of the real-time clock row.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. An ordering device comprising an array of logic cells arranged as a set of rows, each row capable of storing a data value in the corresponding logic cells, each logic cell performing a logic function which determines a state of a set of outputs of each row in response to the data values wherein the logic functions are preselected such that the states of the outputs of each row indicate an ordering of the data values wherein the logic functions determine the states of the outputs of the rows in response to the data values and a set of column inputs to the array.

2. The ordering device of claim 1, wherein the column inputs carry a reference data value such that the states of the outputs of each row indicate which of the rows holds a data value which is less than the reference data value.

3. The ordering device of claim 1, wherein the column inputs carry a reference data value such that the states of the outputs of each row indicate which of the rows holds a data value which is greater than the reference data value.

4. The ordering device of claim 1, wherein the column inputs carry a reference data value such that the states of the outputs of each row indicate which of the rows holds a data value which is equal to the reference data value.

5. An ordering device comprising an array of logic cells arranged as a set of rows, each row capable of storing a data value in the corresponding logic cells, each logic cell performing a logic function which determines a state of a set of outputs of each row in response to the data values wherein the logic functions are preselected such that the states of the outputs of each row indicate an ordering of the data values and further comprising circuitry for individually disabling the rows.

6. A system, comprising:
ordering device including an ordering array having a set of rows of logic cells, each row capable of holding a time value and each logic cell performing a logic function wherein the logic function is preselected to perform an ordering function on the time values;
processor that off loads the ordering function on the time values to the ordering device by generating the time values and writing the time values to the rows of the ordering device wherein the ordering device further comprises an application array having a set of rows of logic cells for holding a set of control values which correspond to the time values in the ordering array.

7. The system of claim 6, wherein the processor generates the control values and writes the control values to the application array when writing the corresponding time values to the ordering array.

8. The system of claim 7, wherein one of the rows of the ordering array is driven by a real-time clock and the logic function is preselected to determine which of the rows of the ordering array holds a minimum value.

9. The system of claim 8, wherein a row output of a row of the ordering array holding the minimum value causes the control value in a corresponding row of the application array to be read out.

10. The system of claim 9, wherein the corresponding row of the application array includes an indicator that indicates to which of a set of channels the control value is to be read out.

11. The system of claim 10, wherein the corresponding row of the application array includes a set of channel logic for steering the control value to an appropriate one of the channels.

12. The system of claim 11, wherein the channel logic includes circuitry for causing the row of the ordering array holding the minimum value to be disabled from subsequently participating in the ordering function.

13. The system of claim 12, wherein the channel logic includes circuitry for selecting one of a subset of the rows of the ordering array that hold the minimum value to be read out.

14. The system of claim 6, wherein the ordering function causes one of the control values to be read out of the application array and provided with an interrupt to the processor.

15. The system of claim 6, wherein the ordering function causes one of the control values to be read out of the application array and provided with an interrupt to another processor in the system.

16. The system of claim 6, wherein the ordering function causes the control values to be read out of the application array and provided to circuitry for generating a waveform.

17. The system of claim 6, wherein the ordering function causes the control values to be read out of the application array and provided to circuitry for controlling a positioning of one or more axes in a motion control system.

* * * * *